United States Patent
Ohlson

(10) Patent No.: US 6,339,624 B1
(45) Date of Patent: Jan. 15, 2002

(54) TRELLIS DECODING WITH MULTIPLE SYMBOL NONCOHERENT DETECTION AND DIVERSITY COMBINING

(75) Inventor: John Ohlson, Mountain View, CA (US)

(73) Assignee: Stanford Telecommunications, Inc., Sunnyvale, CA (US)

(*) Notice: Subject to any disclaimer, the term of this patent is extended or adjusted under 35 U.S.C. 154(b) by 0 days.

(21) Appl. No.: 09/134,469

(22) Filed: Aug. 14, 1998

Related U.S. Application Data

(60) Provisional application No. 60/056,159, filed on Aug. 19, 1997.

(51) Int. Cl.$^7$ .............................................. H04L 27/06
(52) U.S. Cl. ................... 375/341; 375/262; 375/265; 375/267; 714/789
(58) Field of Search ................... 375/341, 347, 375/262, 232, 267, 265; 714/794, 791, 789

(56) References Cited

U.S. PATENT DOCUMENTS

| | | | |
|---|---|---|---|
| 4,675,871 A | * 6/1987 | Gordon et al. | 714/789 |
| 5,202,903 A | * 4/1993 | Okanoue | 375/347 |
| 5,220,570 A | 6/1993 | Lou et al. | 714/341 |
| 5,349,608 A | 9/1994 | Graham et al. | 375/341 |
| 5,974,091 A | * 10/1999 | Huff | 375/265 |
| 5,995,562 A | * 11/1999 | Koizumi | 375/341 |

OTHER PUBLICATIONS

Raphaeli, D., Efficient Decoding Algorithms for Noncoherent Trellis Coded Phase Modulation, IEEE, pp. 1284–1288, 1994.*

Andrea et al., Approximate ML Decoding of Coded PSK with No Explicit Carrier Phase Reference, IEEE, vol. 42, No. 2/34, pp. 1033–1039, 1994.*

* cited by examiner

Primary Examiner—Stephen Chin
Assistant Examiner—Shuwang Liu
(74) Attorney, Agent, or Firm—Townsend and Townsend and Crew LLP

(57) ABSTRACT

A method and apparatus for taking advantage of diverse signals. Trellis decoding takes advantage of multiple symbol noncoherent detection and diversity combining. Accordingly, combination of diverse signals effectively occurs pre-detection. Tracking loops are not necessary to set weights for each channel. In a QPSK embodiment employing a rate 1/2 convolutional code, an improvement in effective SNR of 1–3 dB may be achieved as compared with non-diverse reception.

4 Claims, 5 Drawing Sheets

TRELLIS DECODING WITH MULTIPLE SYMBOL NONCOHERENT DETECTION AND DIVERSITY COMBINING

STATEMENT OF RELATED APPLICATIONS

This application claims priority from U.S. provisional application No. 60/056,159 filed on Aug. 19, 1997 and having the same title. The contents of this provisional application are corporated herein by reference.

The present application is related to the subject matter of U.S. patent application Ser. No. 08/985,302 entitled TRELLIS CODING WITH MULTIPLE SYMBOL NONCOHERENET DETECTION AND INTERLEAVING TO COMBAT FREQUENCY OFFSET, the contents of which are herein incorporated by reference.

BACKGROUND OF THE INVENTION

The present invention relates generally to digital communication systems and more particularly to a technique for providing enhanced performance.

The discussion that follows assumes an understanding of digital communication principles as known to those of skill in that art. A good general reference in the digital communication field is John G. Proakis, Digital Communications, (McGraw-Hill 1995), herein incorporated by reference.

Conventional Viterbi Algorithm

The Viterbi algorithm accepts as input a sequence of received symbols and determines the maximum likelihood sequence of transmitted symbols. The Viterbi algorithm is applied to decode convolutional coding or trellis coding applied at the transmitter end or to remove the effects of a partial response channel. The algorithm is perhaps best understood by reference to a so-called trellis diagram. A trellis diagram is a time-indexed state diagram. At each trellis stage, n, there are two or more states. Transitions between states at a trellis stage, n, and states at a trellis stage n+1 denote transmitted symbols. A path through the trellis consists of a number of successive transitions and denotes a sequence of symbols. The number of states at each stage and the correspondence between transitions and symbols are particular to the relevant trellis code, convolutional code, or partial response channel characteristics. The Viterbi algorithm uses received symbol information to identify a particular path through the trellis and thus determine the maximum likelihood sequence of transmitted symbols.

Computation of the maximum likelihood sequence proceeds on a stage-by-stage basis. Possible paths are eliminated once it becomes clear they cannot be the maximum likelihood path. Given received symbol information, the likelihood of a particular branch being taken is evaluated according to a measure known as the branch metric. For each state, the Viterbi algorithm computes the branch metrics for the surviving paths leading to that state. The branch metric will typically consist of the previously accumulated branch metric for the path plus the branch metric for the transition taken to the new state. Based on the accumulated branch metrics for all the paths leading to the state, the Viterbi algorithm selects a best path to the state and eliminates the other states. Only one path survives to each stage, permitting identification of the maximum likelihood transmitted symbol sequence.

FIG. 2 depicts the prior art operation of a Viterbi decoding algorithm assuming channel phase is known. Consider an AWGN channel model, $$r_n = e^{j\Theta} A s_n + W_n, \quad n= \ldots 0,1,2,\ldots, \tag{1}$$

where $\Theta$ is channel phase; below we consider two cases where channel phase is known and where it is completely unknown. The transmitted symbol $s_n$ is an MPSK symbol, where $s_k = e^{j\phi_k}$, and $\phi_k$ is a uniformly distributed random phase taking values in $\{0, 2\pi/M, \ldots 2\pi(M-1)/M\}$. The received sample is $r_n$, and $w_n$ is an independent sample of zero mean white complex Gaussian noise of variance $\sigma^2$.

The mathematics of a conventional Viterbi decoding algorithm for a convolutional code, assuming channel phase $\Theta$ is known will now be described. To simplify the description, assume the convolutional code has two branches into and out of each state. FIG. 2 depicts a state diagram wherein two states, u and v, at stage n-1, which both have a single branch into state w at stage n. Associated with state u is the previously determined winning path into state u, denoted by $s_{u,0}, s_{u,1}, \ldots s_{u,n-1}$, and a path metric $m_u$. Associated with state v is the previously determined winning path into state v, denoted by $s_{v,0}, s_{v,1}, \ldots s_{v,n-1}$, and a path metric $m_z$. Let $s_{u,n}$ be the symbol on the branch from state u to state w, and let $s_{v,n}$ be the symbol on the branch from state v to state w. Let $s_0, s_1, \ldots s_{n-}s_n$ be the first n actual transmitted symbols, and let $r_0, r1, \ldots r_{n-1}, r_n$ be the corresponding received samples. The following discussion explains how to update state w at stage n, by finding the winning branch into state w, the winning path into state w, and the winning path metric for state w. The conventional Viterbi algorithm proceeds in four steps:

(1) Form two branch metrics $$Re[r_n s_{u,n}*(s^{j\Theta})*], \tag{2}$$

and $$Re[r_n s_{v,n}*(s^{j\Theta})*]. \tag{3}$$

(2) Use branch metric (2) to form a candidate path metric for the top path, $$m_{u}=Re[r_n s_{u,n}*(e^{j\Theta})*], \tag{4}$$

and use branch metric (3) to form a candidate path metric for the bottom path, $$m_v + Re[r_n s_{v,n}*(e^{j\Theta})*]. \tag{5}$$

(3) Compare (4) and (5) and select a winner, say (4).

(4) Update state w at stage n. The winning path into state w at stage n is $s_{w,0}, s_{w,1}, \ldots s_{w,n-}, s_{w,n}$ where $$(s_{w,0}, s_{w,1}, \ldots s_{w,n-1}, s_{w,n}) = (s_{u,0}, s_{u,1}, \ldots s_{u,n-1}, s_{u,n}).$$

The winning path metric is $$m_w = m_u + Re[r_n s_{u,n}*(e^{j\Theta})*].$$

Non-coherent Viterbi Decoding Algorithm Operation

FIG. 3 depicts the prior art operation of a Viterbi decoding algorithm using multiple symbol noncoherent detection. Non-coherent Viterbi decoding is described in [9] A. N. D'Andrea, U. Mengali, and G. M. Vitetta, "Approximate ML decoding of coded PSK with no explicit carrier phase reference," *IEEE Transactions on Communications*, Vol. 42, no. 2/3/4, February/March/April 1994, pp. 1033–1039, incorporated herein by reference. This approach can be used without an explicit phase reference, and so assume that $\Theta$ in (1) is uniformly distributed on $(-\pi, \pi)$ FIG. 3 is the same as FIG. 2 except that each state has a path history variable associated with it; thus states u and v at stage n-1 have the path history variables $W_{u,n-1}$ and $W_{v,n-1}$, associated with them, respectively, where $W_{u,n-1}$ and $W_{v,n-1}$ are defmed by $$W_{u,n-1} = \sum_{k=0}^{n-1} \alpha^{n-1-k} r_k s_{u,k}^*$$

and $$W_{v,n-1} = \sum_{k=0}^{n-1} \alpha^{n-1-k} r_k s_{v,k}^*,$$

and $\alpha$ is a real number in the range $0 \leq \alpha \leq 1$. For a particular state x, $x \in \{u, v\}$, the path history variable is a function of the winning path into state x, $s_{x,0}$, $s_{x,1}$, . . .$s_{x,n-1}$, and the channel sample history $r_0$, $r_1$, . . . $r_{n-1}$, $r_n$; the path history variable for a particular path acts as a remodulated phase reference for that path and takes the place of the coherent phase reference term $(e^{j\Theta})^*$ in steps (1)–(4) above.

The discussion will now turn to how to find the winning branch into state w at stage n, the winning path into state w, the winning path metric for state w, and the path history variable for state w at stage n, $W_{w,n}$. The modified Viterbi algorithm proceeds in four steps:

(1a) Form two branch metrics $$\mathrm{Re}[r_n s_{u,n}^* W_{u,n-1}^*], \quad (6)$$

and $$\mathrm{Re}[r_n s_{v,n}^* W_{v,n-1}^*] \quad (7)$$

(2a) Use branch metric (6) to form a candidate path metric for the top path, $$m_u + \mathrm{Re}[r_n s_{u,n}^* W_{u,n-1}^*], \quad (8)$$

and use branch metric (7) to form a candidate path metric for the bottom path, $$m_v + \mathrm{Re}[r_n s_{v,n}^* W_{vn-1}^*]. \quad (9)$$

(3a) Compare (8) and (9) and select a winner, say (8).
(4a) Update state w at stage n. The winning path into state w at stage n is $s_{w,0}, s_{w,1}, \ldots s_{w,n-1}, s_{w,n}$ where $$(s_{w,0}, s_{w,1}, \ldots s_{w,n-1}, s_{w,n}) = (s_{u,0}, s_{u,1}, \ldots s_{u,n-1}, s_{u,n}).$$

The winning path metric is $$m_w = m_u + \mathrm{Re}[r_n s_{u,n}^* W_{u,n-}^*].$$

The winning path history variable is

Note that steps (1a)–(4a) are very similar to steps (1)–(4), with the path history variable taking the place of the coherent phase reference term $(e^{j\Theta})^*$.

Steps (1a)–(4a), illustrate one particular way of implementing trellis decoding with multiple symbol noncoherent detection. There are several other ways of implementing trellis decoding with multiple symbol noncoherent detection described in the literature which differ in how the branch metrics in (1a) are formed. However all approaches are fundamentally the same in that each branch metric in (1a) is formed using received samples and previous symbols along the winning path into that branch.

Diversity Receivers

One technique for improving performance in digital communications is to take advantage of information transmitted between a data source and a receiver via two or more different channels. This is known in the art as diversity reception. For example, a receiver site may have two different antennas. The two antennas may receive a signal generated by the same transmitter, albeit by somewhat different paths, or signals received from two different transmitters. The transmitters may have different locations, different frequencies, or both. By integrating the information received via two or more signals received via two or more different channels, one may obtain better performance than would be available with anyone signal independently.

Various receiver architectures have been developed for taking advantage of such multiple signals. For example, it is know to essentially employ a distinct receiver for each received signal. Each receiver has its own data output. The transmitted data is estimated by weighting each receiver output and either 1) adding the outputs together, 2) switching among the outputs, or 3) having the various receivers vote as to the transmitted data. The performance improvement achieved by this technique is relatively low. Also, tracking loops are required to set the weights for each received signals and these loops do not operate properly in low noise conditions. What is needed is an improved technique for taking advantage of signals received via diverse channels.

SUMMARY OF INVENTION

The present invention provides a method and apparatus for taking advantage of diverse signals. According to the present invention, trellis decoding takes advantage of multiple symbol noncoherent detection and diversity combining. Accordingly, combination of diverse signals effectively occurs pre-detection. Tracking loops are not necessary to set weights for each channel. In a QPSK embodiment employing a rate ½ convolutional code, an improvement in effective SNR of 1–3 dB may be achieved as compared with non-diverse reception.

In accordance with a first aspect of the present invention, a method for receiving a signal via diverse channels includes steps of: receiving a first signal via a first channel, receiving a second signal via a second channel, converting the first signal to a first stream of received symbols estimating a transmitted coded symbol stream, converting the second signal to a second stream of symbols estimating the transmitted coded symbol stream, and applying a Viterbi decoding procedure to the first stream of symbols and the second stream of symbols wherein branch metrics for the Viterbi decoding procedure are evaluated based on both the first stream of received symbols and the second stream of received symbols.

In accordance with a second aspect of the present invention, a receiver includes a non-coherent Viterbi decoder that accepts as input a first stream of received symbols and a second stream of received symbols, the first stream and the second stream estimating a transmitted symbol stream. The Viterbi decoder includes a branch metric evaluator that evaluates branch metrics responsive to both the first stream of received symbols and the second stream of received symbols, and a path history variable evaluator that evaluates path history variables responsive to both the first stream of received symbols and the second stream of received symbols.

In accordance with a third aspect of the present invention, an enhanced Viterbi decoder processes received symbol sequences by selecting a maximum likelihood path through states of a trellis. The path includes successive transitions between states. The enhanced Viterbi decoder include: an input port that receives a first stream of received symbols received via a first channel and a second stream of received symbols received via a second channel. The first stream and the second stream estimate a transmitted symbol stream. The enhanced Viterbi decoder further include: a branch metric evaluator that determines a likelihood measure for a particular transition between states. The likelihood measure is responsive to both the first stream and the second stream. The enhanced Viterbi decoder still further includes a path evaluator that selects and eliminates non-maximum likelihood paths based on a cumulative likelihood measure evaluated based on likelihood measures for successive transitions as evaluated by the branch metric evaluator.

A further understanding of the nature and advantages of the inventions herein may be realized by reference to the remaining portions of the specification and the attached drawings.

DESCRIPTION OF SPECIFIC EMBODIMENTS

Figure 1A:
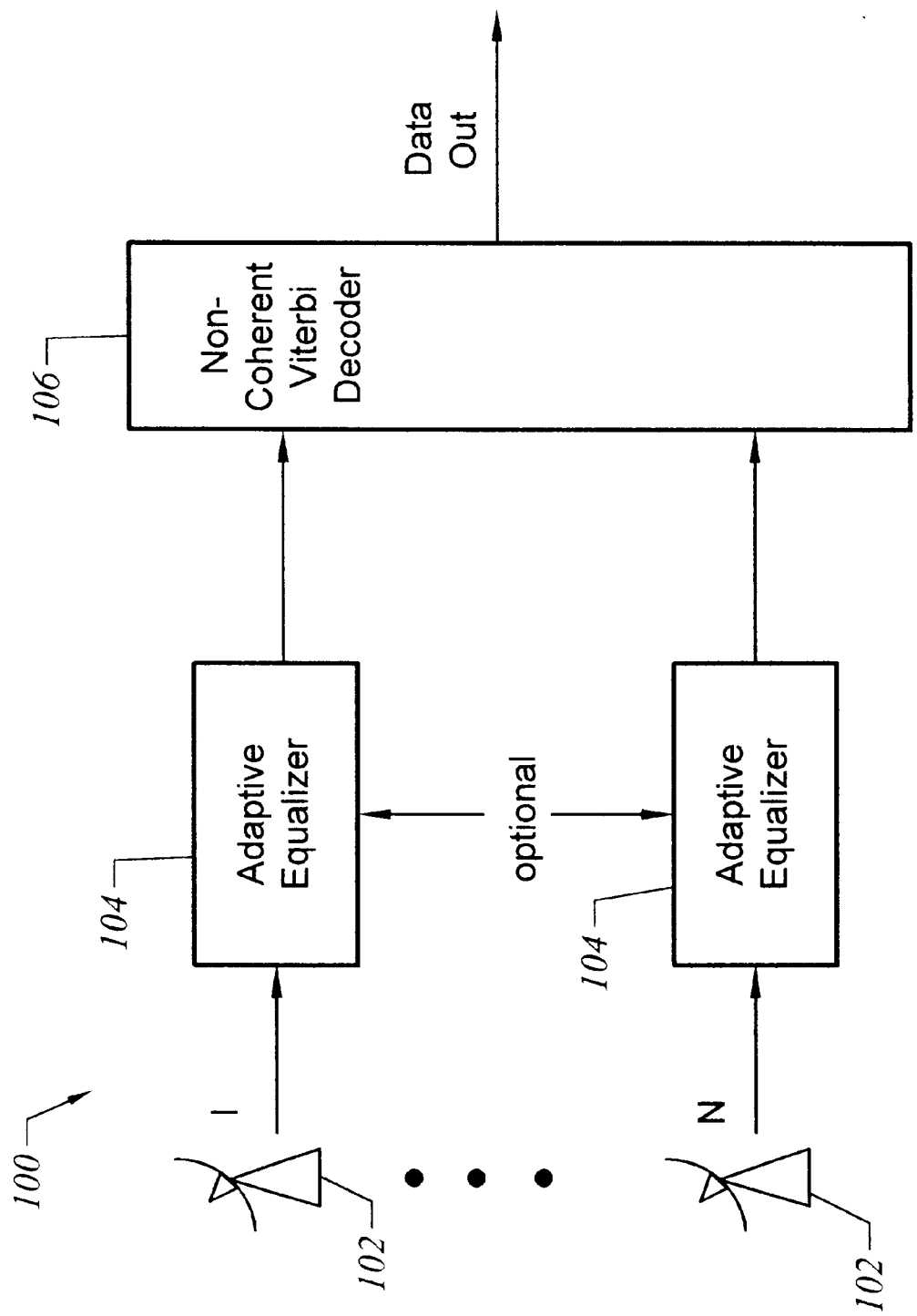
FIG. 1A depicts a diversity receiver architecture according to one embodiment of the present invention.

FIG. 1A depicts a simplified representation of a diversity receiver architecture 100 according to one embodiment of the present invention. Diverse signals may be received by one of N antennas 102. After appropriate downconversion, each signal is subject to equalization by one of N optional adaptive equalizers 104. The output of each equalizer 104 is a stream of received symbol estimates. Each equalizer output is an input to a special non-coherent Viterbi decoder 106 in accordance with one embodiment of the present invention. The output of non-coherent Viterbi decoder 106 is an estimate of the transmitted symbol stream.

The present invention may take advantage of, e.g., frequency diversity in the form of multiple link frequencies, or spatial diversity, multiple antennas receiving signals from either a common transmitter or multiple transmitters. Thus, there may be various sources for the multiple symbol streams input to non-coherent Viterbi decoder 106.

Figure 1B:
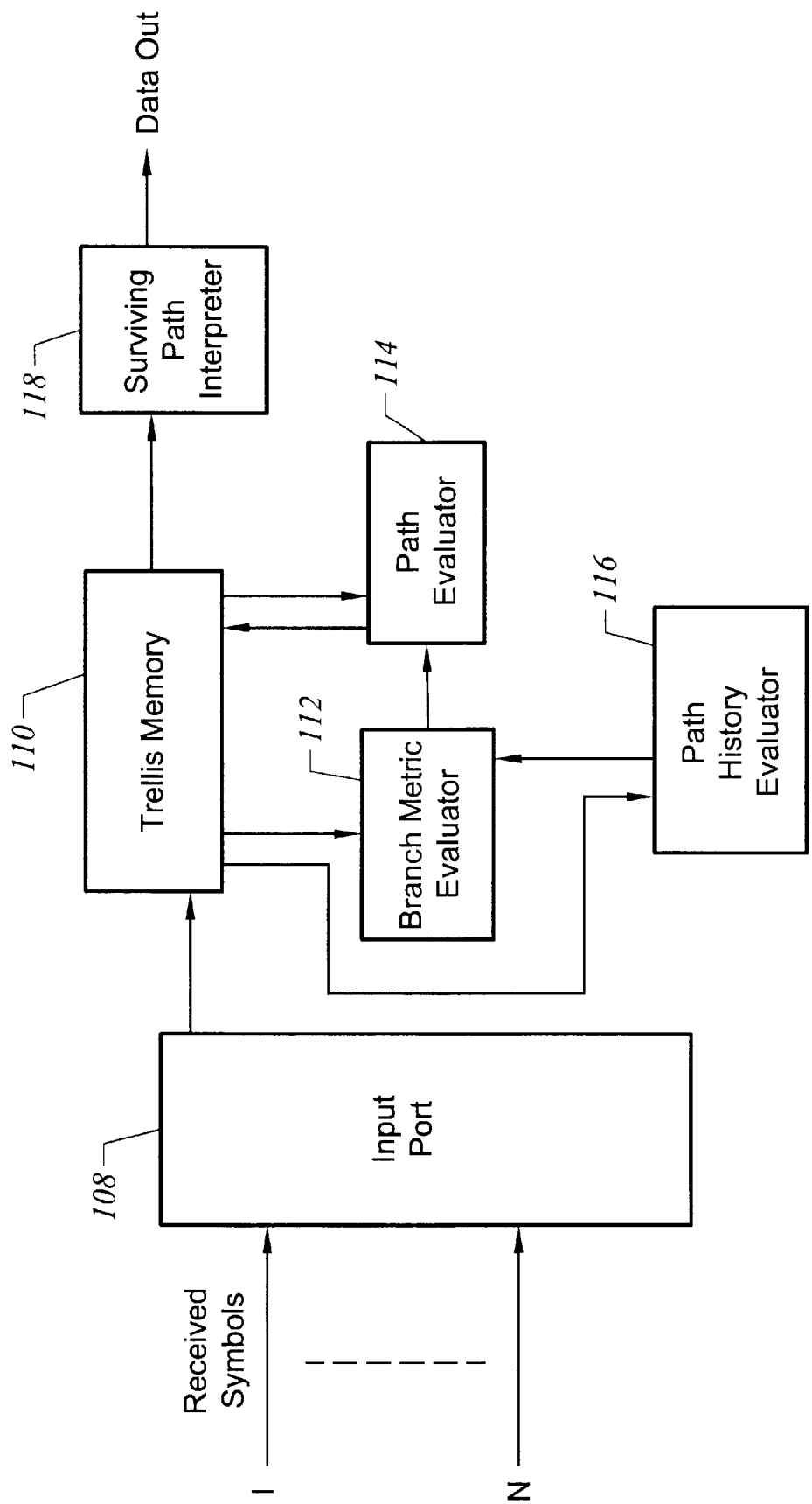
FIG. 1B is a functional representation of the operation of a non-coherent Viterbi decoder in accordance with one embodiment of the present invention.

FIG. 1B is a functional representation of the operation of non-coherent Viterbi decoder 106. The received symbol streams are accepted by an input port 108 and forwarded to a trellis memory 110. Trellis memory 110 holds the received symbol information. During Viterbi processing, a path evaluator 114 identifies at each stage, a surviving path to each state. Information about the surviving paths is stored in trellis memory 110. The evaluation and selection of surviving paths takes advantage of branch metrics evaluated for transitions between states at successive stages. These evaluations performed by a branch metric evaluator 112. In a preferred embodiment, a phase reference for surviving paths is developed and maintained by a path history evaluator 116. When only a single path survives to a given stage, it can be identified as a maximum likelihood path. A surviving path interpreter 118 then interprets this path to estimate the transmitted symbols, inherently removing the effect of any trellis code, convolutional code, or partial response channel characteristic whose structure is inherent in the design of the state machine encoded by the Viterbi decoder trellis.

Figure 4:
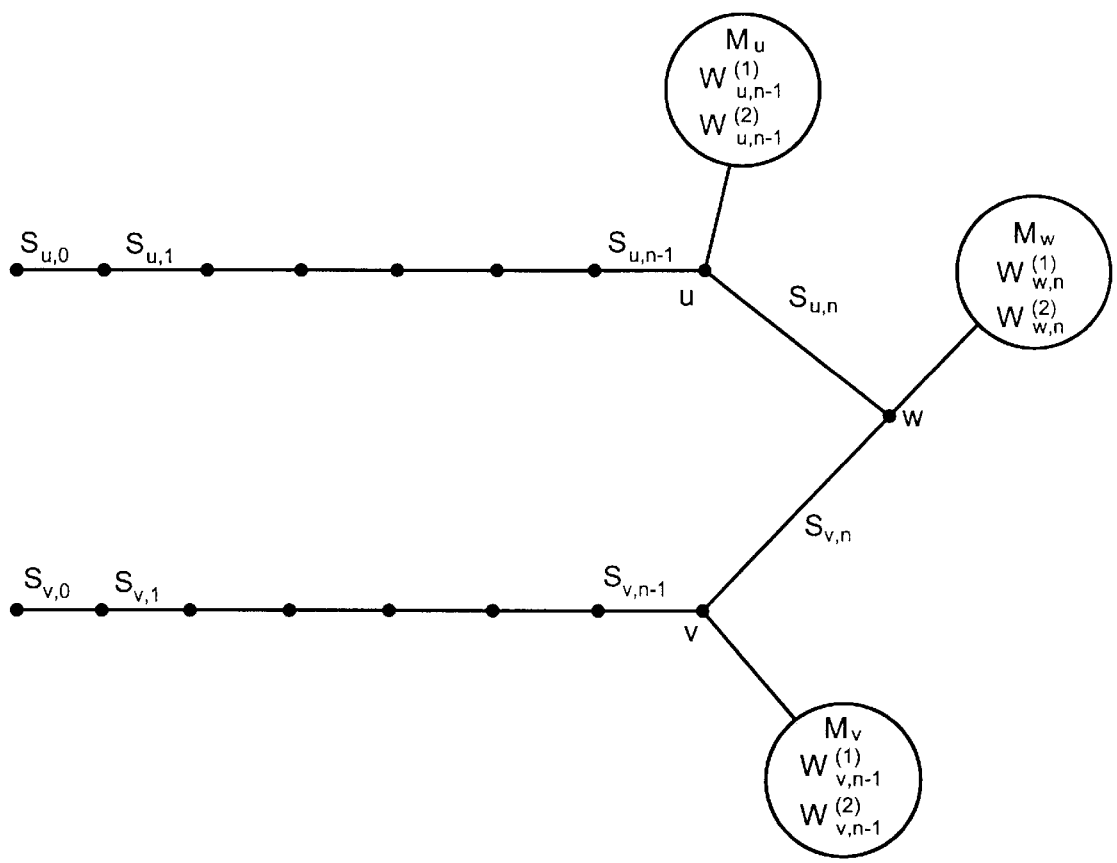
FIG. 4 depicts modified Viterbi decoder operation to take advantage of diverse signals in accordance with one embodiment of the present invention.

FIG. 4 depicts modified Viterbi decoder operation to take advantage of diverse signals in accordance with one embodiment of the present invention. For the sake of simplified explanation, it is assumed there are two independent AWGN channels, with samples $r_o^{(1)} \ldots r_{n-1}^{(1)}, r_n^{(1)}$ received from a first channel and samples $r_o^{(2)} \ldots r_{n-1}^{(2)}, r_n^{(2)}$ received from a second channel. Further, it is assumed that the signal in the first channel is transmitted with an amplitude level $A^{(1)}$, in noise power $(\sigma^{(1)})^2$, and that the signal in the second channel is transmitted with an amplitude level $A^{(2)}$, in noise power $(\sigma^{(2)})^2$.

Figure 2:
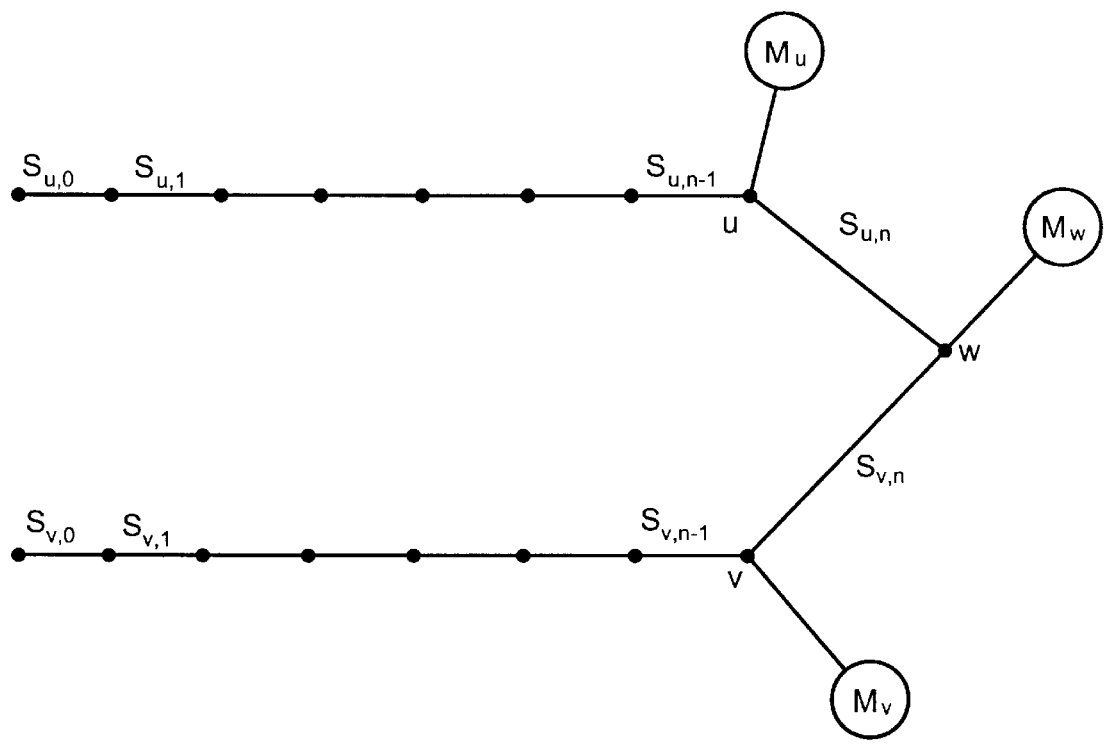
FIG. 2 depicts the prior art operation of a Viterbi decoding algorithm assuming channel phase is known.
Figure 3:
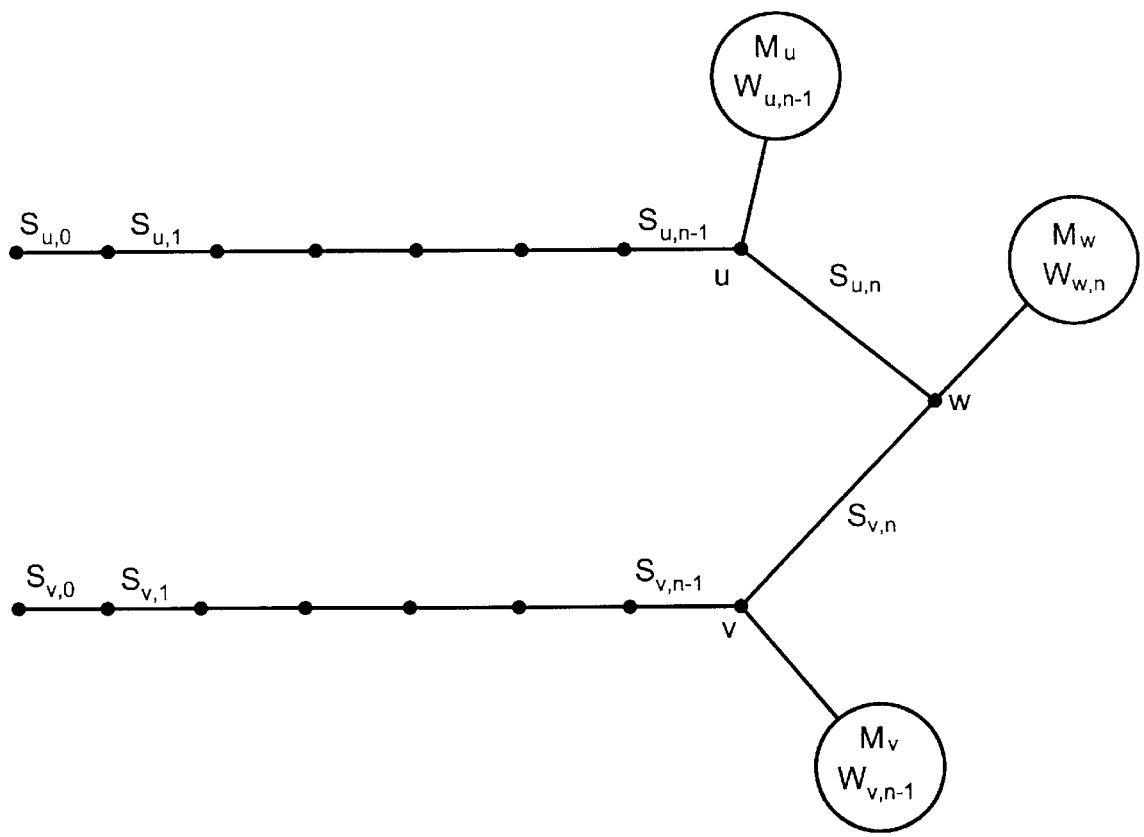
FIG. 3 depicts the prior art operation of a Viterbi decoding algorithm using multiple symbol noncoherent detection.

Like in FIGS. 2–3, the discussion assumes only two channels, and a trellis with two states at each stage with two possible surviving paths into each state. Of course, the present invention is usable with any trellis structure and with any number of diverse channels. One difference between FIG. 4 and FIG. 3 is that each state now has two path history variables associated with it. These are maintained by path history evaluator 116 of FIG. 1B. Thus, state u has path history variables $W_{u,n-1}^{(1)}$ and $W_{u,n-1}^{(2)}$ associated it, where path history variable $W_{u,n-1}^{(1)}$ is for the first channel, defined by $$W_{u,n-1}^{(1)} = \sum_{k=0}^{n-1} \alpha^{n-1-k} r_k^{(1)} S_{u,k}^*,$$

and path history variable $W_{u,n-1}^{(2)}$ is for the second channel, defined by $$W_{u,n-1}^{(2)} = \sum_{k=0}^{n-1} \alpha^{n-1-k} r_k^{(2)} S_{u,k}^*,$$

The path history variables for state $W_{v,n-1}^{(1)}$ and $W_{v,n-1}^{(1)}$ are associated with the first and second channel respectively, and defined similarly.

The present invention provides special techniques for finding the winning branch into state w at stage n, the winning path into state w, the winning path metric for state w, and the path history variables for state w at stage n, $W_{w,n}^{(1)}$ and $W_{w,n}^{(2)}$. It is assumed that estimates $\hat{A}^{(1)}$, $\hat{A}^{(2)}$, $(\hat{\sigma}^{(1)})^2$, and $(\hat{\sigma}^{(2)})^2$ of $A^{(1)}$, $A^{(2)}$, $(\sigma^{(1)})^2$, and $(\sigma^{(2)})^2$, respectively, are available. The modified Viterbi algorithm proceeds in four steps:

(1b) Form two branch metrics $$\frac{\hat{A}^{(1)}}{(\hat{\sigma}^{(1)})^2} \mathrm{Re}[r_n^{(1)} S_{u,n}^* (W_{u,n-1}^{(1)})^*] + \frac{\hat{A}^{(2)}}{(\hat{\sigma}^{(2)})^2} \mathrm{Re}[r_n^{(2)} S_{u,n}^* (W_{u,n-1}^{(2)})^*] \quad (10)$$

and $$\frac{\hat{A}^{(1)}}{(\hat{\sigma}^{(1)})^2} \mathrm{Re}[r_n^{(1)} S_{v,n}^* (W_{v,n-1}^{(1)})^*] + \frac{\hat{A}^{(2)}}{(\hat{\sigma}^{(2)})^2} \mathrm{Re}[r_n^{(2)} S_{v,n}^* (W_{v,n-1}^{(2)})^*]. \quad (11)$$

(2b) Use branch metric (10) to form a candidate path metric for the top path, $$m_u + \frac{\hat{A}^{(1)}}{(\hat{\sigma}^{(1)})^2} \mathrm{Re}[r_n^{(1)} S_{u,n}^* (W_{u,n-1}^{(1)})^*] + \frac{\hat{A}^{(2)}}{(\hat{\sigma}^{(2)})^2} \mathrm{Re}[r_n^{(2)} S_{u,n}^* (W_{u,n-1}^{(2)})^*], \quad (12)$$

and use branch metric (11) to form a candidate path metric for the bottom path, $$m_v + \frac{\hat{A}^{(1)}}{(\hat{\sigma}^{(1)})^2} \text{Re}[r_n^{(1)} S_{v,n}^* (W_{v,n-1}^{(1)})^*] + \frac{\hat{A}^{(2)}}{(\hat{\sigma}^{(2)})^2} \text{Re}[r_n^{(2)} S_{v,n}^* (W_{v,n-1}^{(2)})^*]. \quad (13)$$

(3b) Compare (12) and (13) and select a winner, say (12).

(4b) Update state w at stage n. The winning path into state w at stage n is $S_{w,0}, S_{w,1}, \ldots S_{w,n-1}, S_{w,n}$ where $$(S_{w,0} S_{w,1}, \ldots S_{w,n-}, S_{w,n}) = (S_{u,0} S_{u,1}, \ldots S_{u,n-1}, S_{u,n}).$$

The winning path metric is $$m_w = m_u + \frac{\hat{A}^{(1)}}{(\hat{\sigma}^{(1)})^2} \text{Re}[r_n^{(1)} S_{u,n}^* (W_{u,n-1}^{(1)})^*] + \frac{\hat{A}^{(2)}}{(\hat{\sigma}^{(2)})^2} \text{Re}[r_n^{(2)} S_{u,n}^* (W_{u,n-1}^{(2)})^*].$$

The winning path history variables are $$W_{w,n}^{(1)} = r_n^{(1)} S_{u,n}^* = \alpha W_{u,n-1}^{(1)}$$

and $$W_{w,n}^{(2)} = r_n^{(2)} S_{u,n}^* = \alpha W_{u,n-}^{(2)}.$$

Steps (1b)–(4b), have illustrated one particular way of implementing trellis decoding with multiple symbol noncoherent detection with diversity combining which is based on the particular implementation of multiple symbol noncoherent detection discussed in (1a)–(4a). However, as was discussed in connection with (1a)–(4a), one can easily modify the particular way of doing multiple symbol noncoherent detection and obtain a superficially different implementation, which however in fundamental principle is the same as that illustrated.

In the foregoing specification, the invention has been described with reference to specific exemplary embodiments thereof. It will, however, be evident that various modifications and changes may be made thereunto without departing from the broader spirit and scope of the invention as set forth in the appended claims and their full scope of equivalents.

For example, although discussed for MPSK modulation, the same technique of diversity combining can be used with other modulations. Although discussed for the AWGN channel, the same technique can be used for other channel impairments such as fading channels. The branch metrics in diversity combining are weighted according to maximal ratio combining. The same techniques can be used if other combining weights are used, or if no combining weights are used. The same technique of diversity combining can be used in conjunction with other implementations of multiple symbol noncoherent detection described in the literature.

What is claimed is:

1. In a digital communication system, an enhanced Viterbi decoder system that processes a first stream of received symbols and a second stream of received symbols by selecting a maximum likelihood path through states of a trellis, said path comprising successive transitions between states, said enhanced Viterbi decoder comprising:

a branch metric evaluator that determines a likelihood measure for a particular transition between states, said likelihood measure being responsive to both said first stream and said second stream; and a path evaluator that selects and eliminates non-maximum likelihood paths based on a cumulative likelihood measure evaluated based on likelihood measures for successive transitions as evaluated by said branch metric evaluator, said first received symbol stream being denoted by $r_0^{(1)} \ldots r_{n-1}^{(1)}, r_n^{(1)}$ 1, said second received symbol sequence being denoted by $r_0^{(2)} \ldots r_{n-1}^{(2)}, r_n^{(2)}$ 2, said first channel having a signal-to-noise ratio $\hat{A}^{(1)}/(\hat{\sigma}^{(1)})^2$, said second channel having a signal-to-noise ratio $\hat{A}^{(2)}/(\hat{\sigma}^{(2)})^2$, a surviving path into a state u being denoted by $s_{u,0}, s_{u,1}, \ldots s_{u,n-1}$, a surviving path into a state v being denoted by $s_{v,0}, s_{v,1}, \ldots s_{v,n-1}$, wherein said path history evaluator maintains said path history variables for said surviving path into said state u for said first and second channels as $$W_{u,n-1}^{(1)} = \sum_{k=0}^{n-1} \alpha^{n-1-k} r_k^{(1)} s_{u,k}^*,$$

and $$W_{u,n-1}^{(2)} = \sum_{k=0}^{n-1} \alpha^{n-1-k} r_k^{(2)} s_{u,k}^*;$$

said path history evaluator maintains said path history variables for said surviving path into said state v for said first and second channels as $$W_{v,n-1}^{(1)} = \sum_{k=0}^{n-1} \alpha^{n-1-k} r_k^{(1)} s_{v,k}^*,$$

and $$W_{v,n-1}^{(2)} = \sum_{k=0}^{n-1} \alpha^{n-1-k} r_k^{(2)} s_{v,k}^*,$$

wherein $0 < \alpha 21$ 1, said branch metric evaluator determines a first branch metric for a transition from state u to a successor state w to be $$\frac{\hat{A}^{(1)}}{(\hat{\sigma}^{(1)})^2} \text{Re}[r_n^{(1)} S_{u,n}^* (W_{u,n-1}^{(1)})^*] + \frac{\hat{A}^{(2)}}{(\hat{\sigma}^{(2)})^2} \text{Re}[r_n^{(2)} S_{u,n}^* (W_{u,n-1}^{(2)})^*],$$

$S_{u,n}$ being a transmitted symbol associated with said transition from state u to state w; and said branch metric evaluator determines a second branch metric for a transition from state v to state w to be $$\frac{\hat{A}^{(1)}}{(\hat{\sigma}^{(1)})^2} \text{Re}[r_n^{(1)} S_{v,n}^* (W_{v,n-1}^{(1)})^*] + \frac{\hat{A}^{(2)}}{(\hat{\sigma}^{(2)})^2} \text{Re}[r_n^{(2)} S_{v,n}^* (W_{v,n-1}^{(2)})^*],$$

$S_{v,n}$ being a transmitted symbol associated with said transition from state v to state w.

2. The enhanced Viterbi decoder of claim 1 further comprising a path history evaluator that maintains a path history variable representing a phase reference for each surviving path for each of said first and second channels and wherein said likelihood measure for a selected transition from a selected state depends on the path history variables for both said first and second channels of a surviving path to said selected state.

3. The enhanced Viterbi decoder of claim 1 wherein:

said path evaluator evaluates a first path metric for a first path into said state w including said transition from said transition from said state u to said state w to be a sum of a path metric previously computed for said surviving path to said state u and said first branch metric;

said path evaluator evaluates a second path metric for a second path into said state w including said transition from said state v to said state w to be a sum of a path metric previously computed for said surviving path to said state v and said second branch metric; and said path evaluator selects a surviving path into state w from said first path and said second path to be the path with the smaller path metric.

4. The enhanced Viterbi decoder of claim 3 wherein:

said path history evaluator evaluates a path history variable for said surviving path into state w for said first channel to be $W_{w,n}^{(1)} = r_n^{(1)} S_{u,n}^* + \alpha W_{u,n-1}^{(1)}$; and said path history evaluator evaluates a path history variable for said surviving path into state w for said second channel to be $W_{w,n}^{(2)} = r_n^{(2)} S_{u,n}^* + \alpha W_{u,n-1}^{(2)}$.

* * * * *